United States Patent [19]
Donovan

[11] Patent Number: 5,743,691
[45] Date of Patent: Apr. 28, 1998

[54] CLINCH-TYPE FASTENER MEMBER

[75] Inventor: Steven P. Donovan, Roscoe, Ill.

[73] Assignee: Textron Inc., Providence, R.I.

[21] Appl. No.: 792,776

[22] Filed: Feb. 3, 1997

[51] Int. Cl.$^6$ .................. F16B 37/04; B23P 11/00
[52] U.S. Cl. .................. 411/180; 411/107; 29/432.1
[58] Field of Search .................. 411/107, 179, 411/180, 181; 29/432.2, 432.1

[56] References Cited

U.S. PATENT DOCUMENTS

| | | | |
|---|---|---|---|
| 1,946,064 | 2/1934 | Creveling | 411/180 |
| 3,399,705 | 9/1968 | Breed et al. | 411/180 |
| 3,736,969 | 6/1973 | Warn et al. | 411/179 |
| 3,967,669 | 7/1976 | Egner . | |
| 4,637,766 | 1/1987 | Milliser | 411/180 |
| 4,893,976 | 1/1990 | Milliser et al. | 411/180 |
| 4,985,978 | 1/1991 | Milliser et al. | 29/511 |
| 5,513,933 | 5/1996 | Rom | 411/180 |

FOREIGN PATENT DOCUMENTS 2920211  11/1980  Germany .................. 411/180

*Primary Examiner*—Neill R. Wilson
*Attorney, Agent, or Firm*—Trexler, Bushnell, Giangiorgi & Blackstone, Ltd.

[57] ABSTRACT

A novel clinch-type fastener member is engaged through first and second workpieces to form a mechanically locked joint which is highly resistant to vibrational loosening. The fastener member has a first portion and a second portion defined by a shank portion which extends therefrom. The first portion has a protuberance, formed from a ring, thereon which extends outwardly therefrom. The shank portion has a projection, formed from a ring, spaced a predetermined distance from the first portion to define a retaining groove. To engage the fastener member with the workpieces, the fastener member is rotated into engagement therewith. The protuberance on the first portion engages a top surface of the first workpiece and rotational and compressive forces are applied to the fastener member thereby causing the protuberance to deform the first workpiece material to cause the material to flow into the retaining groove provided of the fastener member. The projection on the shank portion generally contacts the first workpiece such that when the deformed material flows into the retaining groove, the deformed material is captured between the projection and the first portion.

17 Claims, 2 Drawing Sheets

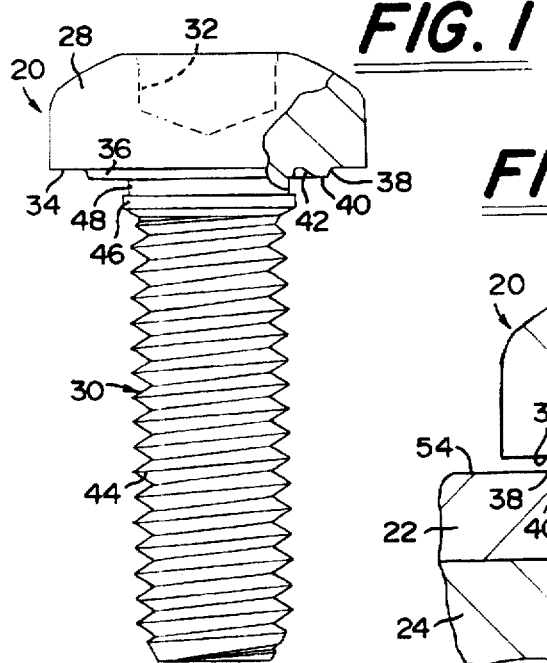
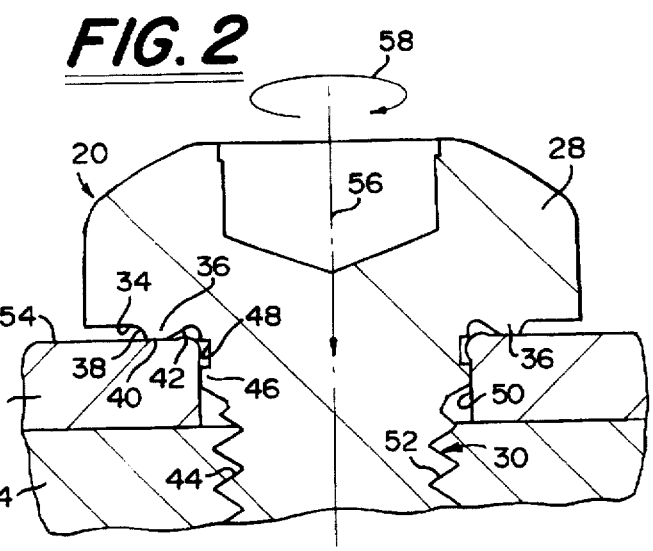
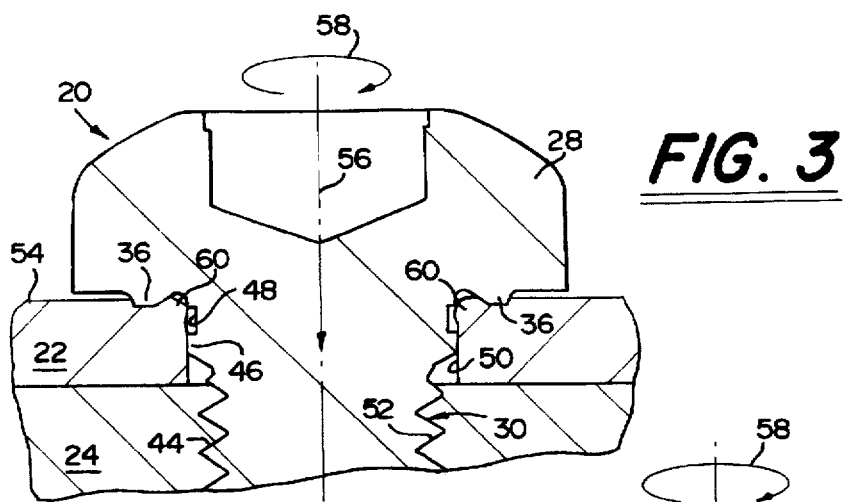
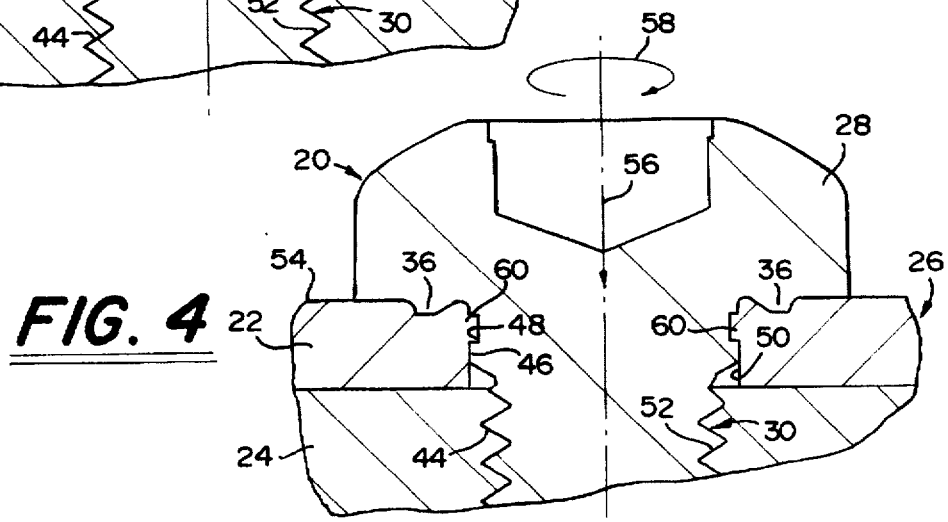

CLINCH-TYPE FASTENER MEMBER

BACKGROUND OF THE INVENTION

The present invention relates to a self-clinching fastener member and the method of assembling the fastener member with a pair of workpieces to form a joint. More particularly, the present invention presents an improved clinch-type fastener member which enables and insures a locking action such that the fastener member is resistant to vibrational forces and is interlocked with one of two workpieces which form a mechanical joint, such as the attachment of a cover member, i.e., the first workpiece, to a housing, i.e., the second workpiece.

When securing two or more workpieces together with a fastener member into a through or blind tapped aperture, it is desirable to have a resistance to vibration when the fastener member is placed in service to prevent the fastener member from working its way out of engagement with the workpieces, due to vibrational forces encountered during service. The resistance to vibration is related to the service loads on the joint, the clamp force in the joint, the coefficient of friction at the joint interface, and the prevailing torque of the fastener member.

Prior art thread forming screws and fastener members have employed a nylon patch to create a clamp force and provide a prevailing torque for resistance to vibrational loosening. Adhesive patches have also been used on the external thread of the fastener member to secure the fastener member to the internal thread of the tapped aperture, however, the adhesive patches are expensive and have temperature limitations.

Thus, an improved design was sought, and resulted in the fastener member of the present invention, which provides a mechanical lock between the workpieces and the fastener member and which provides a greater resistance to vibrational loosening than existing designs. The present invention also allows for removal of the fastener member from the workpieces in certain applications. In addition, the fastener member of the present invention may be removed with one of the workpieces, while being disengaged from the other. Further, the present invention allows for the use of a machine screw thread or a tapping thread on the fastener member when the shank portion has an externally threaded portion and the fastener member is in the nature of a standard bolt member or screw member. The fastener member may also be in the form of a nut member wherein an internally threaded configuration is employed. In this instance, the shank portion of the fastener member will have an internal thread which may be formed in a through bore as per a standard nut member, or the internal thread may be formed in a blind bore.

OBJECTS AND SUMMARY OF THE INVENTION

A general object of the present invention is to provide a novel clinch-type fastener member which mechanically locks workpieces together to form a joint and does not rely on prevailing torque for resistance to vibration.

Another object of the present invention is to provide a novel clinch-type fastener member which can be installed in the workpieces to form a joint by using standard drive equipment and rotating the fastener member into place.

A further object of the present invention is to provide a novel clinch-type fastener member which mechanically locks workpieces together yet, in certain applications, can be removed from the workpieces without damage to fastener member and in other applications can be removed from one of the workpieces while remaining attached to the other workpiece.

Briefly, and in accordance with the foregoing, the present invention discloses a novel clinch-type fastener member which is engaged and clamped through first and second workpieces to form a mechanically locked joint which is highly resistant to vibrational loosening.

In a first embodiment, the fastener member has an enlarged head portion and a shank portion extending therefrom. The head portion has a protuberance thereon which extends outwardly from an underside of the head portion. The shank portion has a threaded end portion and structure intermediate of the head portion and the threaded end portion which defines a retaining groove.

In a second embodiment, the fastener member has an body portion and a shank portion extending therefrom. The body portion has a protuberance thereon which extends outwardly from an underside thereof. The shank portion has structure thereon which defines a retaining groove.

The protuberance in each embodiment forms a deformation ring around the underside of the head portion or body portion and is spaced from the shank portion a predetermined distance. A radially inward facing inner surface of the deformation ring is tapered.

The retaining groove in each embodiment is annular and is formed by an annular projection which extends outwardly from the shank portion and is spaced from the head portion or body portion a predetermined distance. The projection forms a ring around the shank portion.

In the first embodiment, to assemble or form the joint, initially, the fastener member is engaged with the first and second workpieces by passing the threaded end portion of the fastener member through the aperture in the first workpiece and rotating the threaded end portion into engagement with the aperture in the second workpiece. This aperture in the second workpiece may have been previously tapped, or the thread on the fastener member may be formed to be any one of a number of self-tapping thread standards, such that the internal thread in the aperture are formed as the fastener member is engaged. Next, once the fastener member is rotated sufficiently far enough, the protuberance on the head portion engages a top surface of the first workpiece. Thereafter, continued driving of the fastener member will produce rotational and compressive forces on the fastener member thereby causing the protuberance to deform the material of which the first workpiece is formed, and causing the material proximate the aperture in the first workpiece to flow into the retaining groove provided on the fastener member. The overall operation wherein the deformation ring engages the first workpiece is in effect a "spinning" operation wherein the rotational forces exerted by the rotating deformation ring cold form the workpiece material. The tapered inner surface of the protuberance serves to direct the flow of the workpiece material into the retaining groove. The projection on the shank portion generally contacts the inner wall of the first workpiece such that when the deformed material flows into the retaining groove, the deformed material is captured between the projection and the head portion. This provides a mechanically locked joint which is highly resistant to vibrational loosening. Further, this deformation interlocks the fastener member with the first workpiece, yet permits the fastener member to rotate relative thereto for continued tightening of the joint, or subsequent removal of the fastener member.

In the second illustrated embodiment, to assemble or form the joint, initially, a bolt member is passed through the workpieces until the head of the bolt member engaged the underside of the second workpiece and an end portion of the threaded shank of the bolt member extends beyond the top surface of the first workpiece. The fastener member is engaged with the threaded end portion of the bolt member by rotating the fastener member into engagement therewith. Next, once the fastener member is rotated sufficiently far enough, the protuberance on the body portion engages a top surface of the first workpiece. Thereafter, continued driving of the fastener member will produce rotational and compressive forces on the fastener member thereby causing the protuberance to deform the material of which the first workpiece is formed, and causing the material proximate the aperture in the first workpiece to flow into the retaining groove provided on the fastener member. Like the first embodiment, the tapered inner surface of the protuberance serves to direct the flow of the workpiece material into the retaining groove. The projection on the shank portion generally contacts the inner wall of the first workpiece such that when the deformed material flows into the retaining groove, the deformed material is captured between the projection and the head portion. This provides a mechanically locked joint which is highly resistant to vibrational loosening. Further, this deformation interlocks the fastener member with the first workpiece, yet permits the fastener member to rotate relative thereto for continued tightening of the joint, or subsequent removal of the fastener member.

Obviously, in each embodiment the deformation ring and preferably the entire fastener member must be harder than the first workpiece. This can be attained through heat treating, material selection, or other methods known in the art.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 1 is a side elevational view, shown partially broken away, of a clinch-type fastener member which incorporates the features of a first embodiment of the present invention;

FIG. 2 is an enlarged, partial cross-sectional view of the clinch-type fastener member shown in FIG. 1 as the fastener member is being initially engaged with a pair of workpieces to form a joint;

FIG. 3 is an enlarged, partial cross-sectional view of the clinch-type fastener member shown in FIG. 1 with the fastener member partially engaged with a pair of workpieces to form a joint;

FIG. 4 is an enlarged, partial cross-sectional view of the clinch-type fastener member shown in FIG. 1 with the fastener member fully engaged with a pair of workpieces to form a joint;

DETAILED DESCRIPTION OF THE PREFERRED EMBODIMENTS

Figure 5:
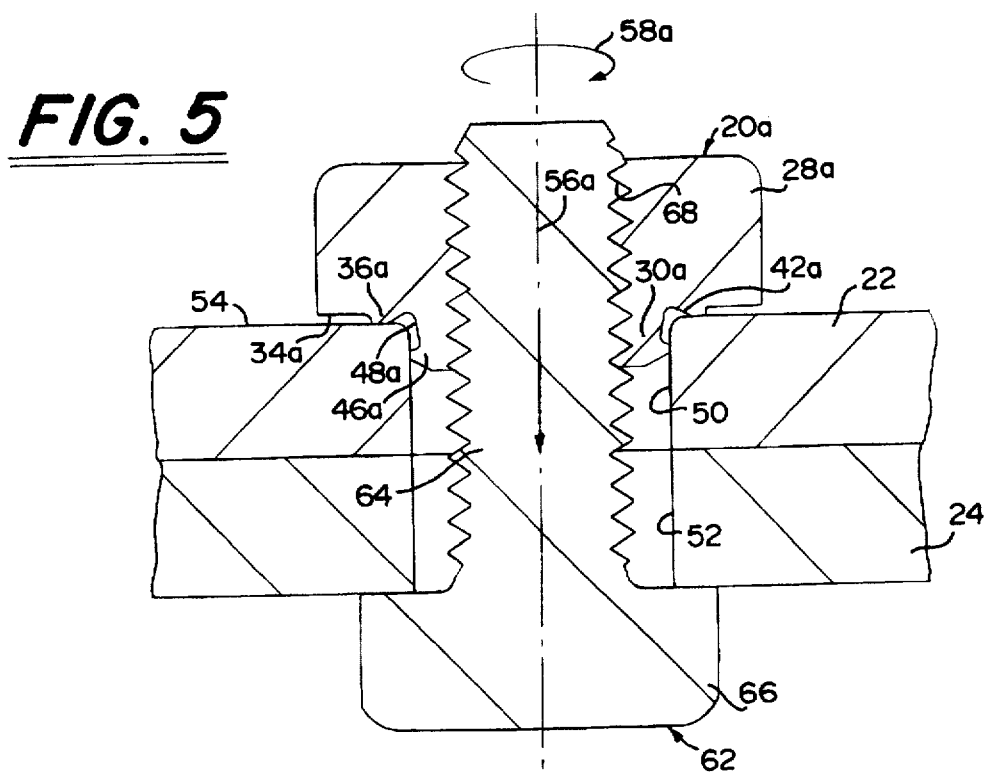
FIG. 5 is a cross-sectional view of a clinch-type fastener member which incorporates the features of a second embodiment of the present invention as the fastener member is being initially engaged with a pair of workpieces and a bolt member to form a joint.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

The present invention provides a novel fastener member 20, 20a which mechanically locks workpieces 22, 24 together to form a joint 26, 26a and is resistant to vibrational loosening thereafter. During engagement of the fastener member 20, 20a with the workpieces 22, 24, the fastener member 20, 20a is rotated into engagement therewith by using standard drive equipment, such as hand driven or automated drive tools. Once fully engaged with the workpieces 22, 24, the fastener member 20, 20a is resistant to axial removal from the workpieces 22, 24 unless driven as described herein. The resulting joint 26, 26a does not rely solely upon prevailing torque for resistance to vibration, but also resists vibrational loosening of the joint 26, 26a with the mechanical lock attained with the fastener member 20, 20a.

Figure 6:
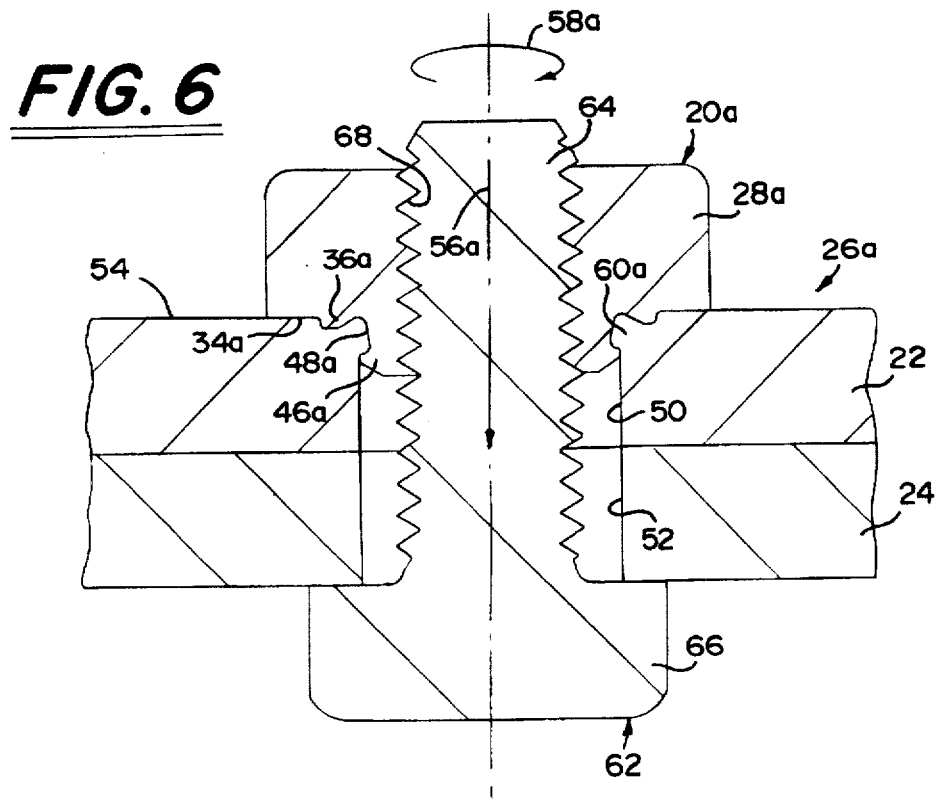
FIG. 6 is a cross-sectional view of the clinch-type fastener member shown in FIG. 5 with the fastener member fully engaged with a pair of workpieces and a bolt member to form a joint.

A first embodiment of the novel fastener member 20 is shown in FIGS. 1–4 and is formed from a bolt member or screw member which is engaged with the workpieces 22, 24. A second embodiment of the novel fastener member 20a is shown in FIGS. 5 and 6 and is formed from a nut member that is engaged with a bolt member 62 and one of the workpieces 22. Like elements in each embodiment are denoted with like reference numerals with the like reference numerals in the second embodiment having the suffix "a" thereafter. The first embodiment of the fastener member 20 is described first with the differences between the first and second embodiments of the fastener members 20, 20a thereafter described.

Attention is now directed to FIGS. 1–4. As shown in FIG. 1, the fastener member 20 which incorporates the features of the invention includes an enlarged head portion 28 and an elongated shank portion 30 extending axially therefrom. The fastener member 20 is preferably formed from a metal material. The metal material of which the fastener member 20 is formed is harder than the metal material of which the first workpiece 22 is formed for reasons described herein. This can be attained through heat treating, material selection, or other methods known in the art.

As shown, the head portion 28 has a drive system in the form of a recess 32 provided in a top surface portion thereof, such as a TORX® or TORX PLUS® drive system, which are multilobular drive systems well known in the art. The recess 32 could also be a standard Hex recess. The drive system 32 can be internal or external as is well known in the art.

The head portion 28 has an underside 34 which engages the first workpiece 22 and is generally flat with the exception of a protuberance 36 that is provided thereon, for reasons described herein in detail, and which projects from the underside 34 of the head portion 28. The protuberance 36 is provided on the underside 34 of the head portion 28 a predetermined distance away from the shank portion 30. The protuberance 36 provides a displacement or deformation ring which encircles the shank portion 30 of the fastener member 20. The displacement ring 36 has an outer surface 38 which is generally transverse to the underside 34 of the head portion 28, an intermediate surface 40 which is generally perpendicular to the outer surface 38 and parallel to the underside 34 of the head portion 28 and an inner surface 42 which tapers from the intermediate surface 40 to the underside 34 of the head portion 28. More specifically, the inner surface 42 of the displacement ring 36 decreases in a radially inward direction. The tapered inner surface 42 is adjacent to the shank portion 30.

The shank portion 30 of the fastener member 20 has a threaded end portion 44 for engagement with the workpiece 24. The threaded end portion 44 may have a machine screw thread for engagement in a pre-tapped aperture, or a self tapping thread form, for use with an untapped aperture to form an internal thread as the fastener member 20 is engaged.

The shank portion 30 also includes an annular projection 46, formed from a retaining ring, which encircles the shank portion 30, disposed intermediate of the threaded end portion 44 and the head portion 28. The retaining ring 46 is spaced a predetermined distance from the head portion 28 so as to define a retaining groove 48 between the retaining ring 46 and the underside 34 of the head portion 28. As shown, the retaining ring 46 has an outer diameter that is greater than the major diameter of the thread provided on the threaded end portion 44. The retaining groove 48 has an outer diameter which is less than the outer diameter of the retaining ring 46.

The method of seating the fastener member 20 which incorporates the features of the invention with the workpieces 22, 24 is shown in FIGS. 2–4. Each workpiece 22, 24 is provided with an inner wall which defines an aperture 52, 54, respectively, through which the fastener member 20 is engaged as described herein. The aperture 50 through the first workpiece 22 has an inner diameter that is larger than the inner diameter of the aperture 52 provided through the second workpiece. The inner diameter of the aperture 50 provided through the first workpiece 22 is less than the diameter at which the displacement ring 36 is provided on the underside 34 of the head portion 28.

Initially, the threaded end portion 44 of the fastener member 20 is passed through the first workpiece aperture 50 and is engaged with the second workpiece aperture 52. The second workpiece aperture 52 may be internally threaded such that the threaded end portion 44 need only to be rotated into place therewith by using standard drive equipment or the aperture 52 may be initially unthreaded such that the internal thread are tapped as the threaded end portion 44 of the fastener member 20 is engaged therewith by using standard drive equipment. In the later instance, the thread form on end portion 44 would have to include one or more thread turns which are of self-tapping design; numerous such self-tapping designs being known to the skilled artisan. The retaining ring 46 will enter into the aperture 50 provided through the first workpiece 22 prior to the engagement of the displacement ring 36 with a top surface 54 of the first workpiece 22. Preferably, the retaining ring 46 has an outer diameter that is approximately equal to the inner diameter of the first workpiece aperture 50 such that the retaining ring 46 slides along the inner wall which defines the aperture 50. The retaining ring 46 also could be configured to deform the aperture 50 as it is engaged therein.

Once the fastener member 20 has been engaged with the workpieces 22, 24 such that the displacement or deformation ring 36 on the underside 34 of the head portion 28 engages the top surface 54 of the first workpiece 22, as shown in FIG. 2, a compressive force, shown by arrow 56, along with the rotational force, shown by arrow 58, already being applied to the fastener member 20 during its initial engagement, is applied to the fastener member 20. This occurs due to the end load achieved by using standard drive equipment to further drive the fastener member 20 into engagement with the workpieces 22, 24, and also due to the mechanical advantage of the engaged threads which draws the fastener member 20 in the direction of arrow 56. As shown in FIG. 3, as the compressive force 56 and the rotational force 58 are being applied to the fastener member 20, the displacement ring 36 on the underside 34 of the head portion 28 is forced into rotational contact with the first workpiece material and deforms the workpiece material proximate thereto by a "spinning" action such that the deformed material 60 cold flows radially inwardly into the retaining groove 48 and contacts the retaining ring 46. The "spinning" operation effected by the rotational forces exerted by the rotating deformation ring cold forms the workpiece material. The radially inward material displacement is achieved by the use of both compressive and rotary or "spinning" forces. The tapered inner surface 42 of the displacement ring 36 assists in directing the cold worked or displaced material 60 radially inward into the retaining groove 48. Because the retaining ring 46 generally contacts the inner wall of the aperture 50, the flow of material 60 is substantially prevented from advancing beyond the juncture of the retaining ring 46 and the inner wall of the aperture 50. The flow of the material 60 sufficiently fills the retaining groove 48 once the fastener member 20 is completely seated in the apertures 50, 52 provided through the workpieces 22, 24 as shown in FIG. 4. This results in a mechanical lock between the fastener member 20 and the first workpiece 22, in that the disposition of material 60 in groove 48 resists withdrawal of the fastener member 20 in the reverse direction. Also, a prevailing torque between the fastener member 20 and the workpiece 24 is created. This procedure provides the advantage in that the fastener member 20 is torqued into engagement with the workpieces 22, 24 like a normal, threaded fastener member and is not staked in like other prior art fastener member designs.

Attention is now directed to FIGS. 5 and 6. The fastener member 20a which incorporates the features of the invention is formed of a nut member having a body portion 28a and a shank portion 30a which extends axially therefrom. Like that of the first embodiment, the fastener member 20a of the second embodiment is preferably formed from a metal material that is harder than the metal material of which the first workpiece 22 is formed for reasons described herein. This can be attained through heat treating, material selection, or other methods known in the art.

In this embodiment of the fastener member 20a, the fastener member 20a is engaged with the first workpiece 22 and with a threaded end portion 64 of the bolt member 62 as described herein. The bolt member 62 has a head portion 66 from which the threaded end portion 64 extends. The thread form on the threaded end portion 64 can be standard threads or self-tapping threads such that in the latter instance, when the bolt threaded end portion 64 is engaged with the fastener member 20a, as described herein, the thread form forms the thread form in the fastener member 20a.

As shown, the body portion 28a and the shank portion 30a have an internal bore 68 provided therethrough. The bore 68 can be threaded or can be initially untapped such that the thread form is formed in the bore 68 when the threaded end portion 64 of the bolt member 62 is engaged therewith as described herein.

The body portion 28a has an underside 34a which engages the first workpiece 22 and is generally flat with the exception of a protuberance 36a that is provided thereon and which projects from the underside 34a of the body portion 28a. The protuberance 36a is provided on the underside 34a of the body portion 28 a predetermined distance away from the shank portion 30a and is identical in structure and in function to the protuberance 36 as described in the first embodiment. Therefore, a reiteration of the structure of the protuberance 36a is not provided.

The shank portion 30a of the fastener member 20a is smooth with the exception of an annular projection 46a, formed from a retaining ring, which encircles the shank portion 30a and is disposed a predetermined distance away from the body portion 28a. The retaining ring 46a is spaced a predetermined distance from the body portion 28a so as to define a retaining groove 48a, identical in structure and function to that of the first embodiment, between the retaining ring 46a and the underside 34a of the body portion 28a. The retaining groove 48a has an outer diameter which is less than the outer diameter of the retaining ring 46a.

The method of seating the fastener member 20a which incorporates the features of the invention with the workpieces 22, 24 is shown in FIGS. 5 and 6. Each workpiece 22, 24 is provided with an inner wall which defines an aperture 50, 52, respectively, through which the fastener member 20a is engaged as described herein. The aperture 50 through the first workpiece 22 may have an inner diameter that is larger than the inner diameter of the aperture 52 provided through the second workpiece or the inner diameters may be equal. The inner diameter of the aperture 50 provided through the first workpiece 22 is less than the diameter at which the displacement ring 36a is provided on the underside 34a of the body portion 28a.

Initially, the bolt member 62 is engaged through the apertures 50, 52 in the workpieces 22, 24 until the head portion 66 of the fastener member 20a is seated against the underside of the second workpiece 22. A portion of the threaded end portion 64 of the bolt member 62 extends beyond the top surface 54 of the first workpiece 22. Thereafter, the bolt member 62 is held stationary by suitable means.

The fastener member 20a is then rotated into engagement with the threaded end portion 64 of the bolt member 62 that extends beyond the top surface 54 of the first workpiece 22. The thread form may be formed in the fastener internal bore 68 as the fastener member 20a is being engaged therewith, or the bore 68 may be pre-tapped such that the fastener member 20a is merely rotated into engagement with the bolt member 62.

Once the fastener member 20a is sufficiently rotated into engagement with the bolt member 62 by using a rotational force as shown by arrow 58a, the retaining ring 46a will enter into the aperture 50 provided through the first workpiece 22 prior to the engagement of the displacement ring 36a with the top surface 54 of the first workpiece 22. Preferably, the retaining ring 46a has an outer diameter that is approximately equal to the inner diameter of the first workpiece aperture 50 such that the retaining ring 46a slides along the inner wall which defines the aperture 50. The retaining ring 46a also could be configured to deform the aperture 50 as it is engaged therein.

Once the fastener member 20a has been engaged with the workpieces 22, 24 such that the displacement or deformation ring 36a on the underside 34a of the body portion 28a engages the top surface 54 of the first workpiece 22, as shown in FIG. 5, a compressive force, shown by arrow 56a, along with the rotational force, shown by arrow 58a, already being applied to the fastener member 20a during its initial engagement, is applied to the fastener member 20a. This occurs due to the end load achieved by using standard drive equipment to further drive the fastener member 20a into engagement with the workpieces 22, 24, and also due to the mechanical advantage of the engaged threads which draws the fastener member 20a in the direction of arrow 56a. As the compressive force 56a and the rotational force 58a are being applied to the fastener member 20a, the displacement ring 36a on the underside 34a of the body portion 28a is forced into rotational contact with the first workpiece material and deforms the workpiece material proximate thereto by a "spinning" action such that the deformed material 60a cold flows radially inwardly into the retaining groove 48a and contacts the retaining ring 46a. The "spinning" operation effected by the rotational forces exerted by the rotating deformation ring cold forms the workpiece material. The radially inward material displacement is achieved by the use of both compressive and rotary or "spinning" forces. The tapered inner surface 42a of the displacement ring 36a assists in directing the cold worked or displaced material 60a radially inward into the retaining groove 48a. Because the retaining ring 46a generally contacts the inner wall of the aperture 50, the flow of material 60a is substantially prevented from advancing beyond the juncture of the retaining ring 46a and the inner wall of the aperture 50. The flow of the material 60a sufficiently fills the retaining groove 48a once the fastener member 20a is completely seated in the apertures 50, 52 provided through the workpieces 22, 24 as shown in FIG. 6. This results in a mechanical lock between the fastener member 20a and the first workpiece 22, in that the disposition of material 60a in groove 48a resists withdrawal of the fastener member 20a in the reverse direction. Also, a prevailing torque between the fastener member 20a and the workpiece 24 is created. This procedure provides the advantage in that the fastener member 20a is torqued into engagement with the workpieces 22, 24 like a normal, threaded fastener member and is not staked in like other prior art fastener member designs.

It is to be understood that the shank portion 30a of the fastener member 20a can be elongated such that the threaded end portion 64 of the bolt member 62 is shorter than illustrated and does not extend beyond the top surface 54 of the first workpiece 22. Instead, the threaded end portion 64 can stop short of the top surface 54 and the shank portion 30a is elongated to engage with the threaded end portion 64 of the bolt member 62.

In each embodiment of the fastener member 20, 20a, the resulting joint 26, 26a that is formed when the fastener member 20, 20a is completely engaged with the workpieces 22, 24 has a resistance to vibrational loosening because of the mechanical lock that is formed therebetween because the fastener member 20, 20a is prevented from rotating out of engagement with the workpieces 22, 24 by vibration. This resistance is higher than existing fastener member designs. As the material 60, 60a that has flowed into the retaining groove 46, 46a resists rotational withdrawal of the fastener member 20, 20a from the workpiece 22, 24 as a result of vibration, the fastener member 20, 20a is highly resistant to vibrational loosening. In addition, the present fastener member 20, 20a provides for a high clamp force in the joint 26, 26a. It should be noted, however, that while the interlock provided by the deforming material 60, 60a into groove 48, 48a resists vibrational loosening, the fastener member 20, 20a is free to rotate relative to workpiece 22, as the interlock is axial only. Thus, the fastener member 20, 20a may be rotated to further tighten the joint 26, 26a or increase clamp load, as may be required to further compress a gasket member disposed between the workpieces 22 and 24, or otherwise employed in the overall joint attained.

Of course, several fastener members 20, 20a (and in the second embodiment, several bolt members 62 are of course used) may be used to form the joint 26, 26a. During certain applications, individual fastener members 20, 20a can be removed from the joint 26, 26a without substantial damage to the fastener member 20, 20a, if desired. To do so, standard drive equipment is used to drive an individual fastener member 20, 20a in a reverse direction. In the first embodiment, as the threaded engagement between the thread on the fastener member 20 and in the second workpiece 24 is reversed, and in the second embodiment, as the threaded engagement between the thread in the fastener member 20a and the bolt member 62 is reversed, as a result of the mechanical advantage provided by the engagement of the fastener thread with the thread in the aperture 52 or on the bolt member 62, the material 60, 60a that has flowed into the retaining groove 48, 48a is sheared off of the first workpiece 22. Thereafter, the fastener member 20, 20a is simply backed out. Alternatively, the fastener members 20, 20a can be removed solely from the second workpiece 24, while maintaining the fastener members 20, 20a engagement with the first workpiece 22. To do so in the first embodiment, each fastener member 20 is backed off a few threads at a time until the second workpiece 22 is released. Because the mechanical advantage provided between the engagement of the fastener thread with the thread in the aperture 52 is not used, the material 60 that has flowed into the retaining groove 48 is not sheared off of the first workpiece 22 and instead, the first workpiece 22 remains locked to the fastener members 20. In this situation, the fastener members 20 will remain interlocked with or mounted to the first workpiece 22. In the second embodiment, each bolt member 62 is simply unscrewed from engagement with its fastener member 20a to free the second workpiece 24 and to keep the fastener members 20a interlocked with the first workpiece 22.

While preferred embodiments of the present invention are shown and described, it is envisioned that those skilled in the art may devise various modifications of the present invention without departing from the spirit and scope of the appended claims.

The invention claimed is:

1. A joint comprising:
   first and second workpieces, each said workpiece being formed from a material and having an aperture defined by an inner wall therethrough;
   a fastener member seated within at least said aperture through said first workpiece, said fastener member having a first portion and a second portion which defines a shank portion, said first portion having a protuberance thereon which protrudes outwardly from an underside of said first portion, said shank portion having structure defining a retaining groove thereon proximate to said first portion, said protuberance on said first portion engaging a top surface of said first workpiece and deforming the material of which said first workpiece is formed to cause the material to flow into said retaining groove during rotational engagement of said fastener member in said aperture through said first workpiece, said fastener member being deterred from axial movement relative to said first workpiece after said material of which said first workpiece is formed has flowed into said retaining groove, said fastener member being capable of rotational movement relative to said first workpiece after said material of which said first workpiece is formed has flowed into said retaining groove; and
   means associated with said fastener member for attaching said fastener member to said second workpiece.

2. A joint as defined in claim 1, wherein said retaining groove is formed by a projection which extends outwardly from said shank portion and is spaced from said first portion a predetermined distance, such that the material which flows into the retaining groove is generally captured between said projection and said first portion.

3. A joint as defined in claim 2, wherein said projection forms a ring around said shank portion.

4. A joint as defined in claim 2, wherein said projection generally contacts the inner wall of said first workpiece as said fastener member is being engaged with said first workpiece such that the material is captured between said projection and said first portion.

5. A joint as defined in claim 1, wherein said protuberance forms a ring around the underside of the first portion.

6. A joint as defined in claim 1, wherein said ring has an inner surface which is tapered so as to help in directing the flow of the first workpiece material into the retaining groove.

7. A joint comprising:
   first and second workpieces, each said workpiece being formed from a material and having an aperture defined by an inner wall therethrough, at least said aperture of said second workpiece includes an internal thread;
   a fastener member seated within at least said aperture through said first workpiece, said fastener member having a first portion and a second portion which defines a shank portion, said first portion having a protuberance thereon which protrudes outwardly from an underside of said first portion, said shank portion having structure defining a retaining groove thereon proximate to said first portion, said protuberance on said first portion engaging a top surface of said first workpiece and deforming the material of which said first workpiece is formed to cause the material to flow into said retaining groove during rotational engagement of said fastener member in said aperture through said first workpiece; and
   means associated with said fastener member for attaching said fastener member to said second workpiece comprising a threaded end portion of the fastener member, said threaded end portion being engaged with said second workpiece to bring said first portion of said fastener member into clamped engagement.

8. A joint as defined in claim 1, wherein said means associated with said fastener member for attaching said fastener member to said second workpiece comprises a bolt member which is passed through the aperture provided through said second workpiece and engaged with said fastener member.

9. A fastener member for engagement with a workpiece being formed from a deformable material, said fastener member comprising:
   a first portion, said first portion having a protuberance thereon which protrudes outwardly from an underside of said first portion; and
   a second portion having structure defining a retaining groove thereon proximate to said first portion, wherein upon engagement of said fastener member with an aperture provided through the workpiece, said protuberance on said first portion engages a top surface of the workpiece and deforms the material of which the workpiece is formed to cause the material of which the workpiece is formed to flow into said retaining groove during rotational engagement of said fastener member with the workpiece, said fastener member being deterred from axial movement relative to the workpiece after the material of which the workpiece is formed has flowed into said retaining groove, and said fastener member being capable of rotational movement relative to the workpiece after the material of which the workpiece is formed has flowed into said retaining groove.

10. A fastener member as defined in claim 9, wherein said retaining groove is formed by a projection which extends outwardly from said second portion and is spaced a predetermined distance away from said first portion, such that the material of which the workpiece is formed which flows into the retaining groove is generally captured between said projection and said first portion.

11. A fastener member as defined in claim 10, wherein said projection forms a ring around said second portion.

12. A fastener member as defined in claim 10, wherein said protuberance forms a ring around the underside of the first portion.

13. A fastener member as defined in claim 12, wherein said ring has an inner surface which is tapered so as to help in directing the flow of the material of which the workpiece is formed into the retaining groove.

14. A method of forming a joint comprising the steps of:
(a) providing first and second workpieces, each said workpiece being formed from a material and having an aperture defined by an inner wall therethrough;
(b) providing a fastener member having a first portion and a second portion being defined by a shank portion, said first portion having a protuberance thereon which protrudes outwardly from an underside of said first portion, said shank portion having structure defining a retaining groove thereon proximate to said first portion;
(c) providing means associated with said fastener member for attaching said fastener member to said second workpiece;
(d) initially engaging said fastener member with said first and second workpieces by using said means associated with said fastener member;
(e) engaging said protuberance on said first portion with a top surface of said first workpiece; and
(f) applying rotational and compressive forces on said fastener member thereby causing said protuberance to deform the material of which said first workpiece is formed to cause said material to flow into said retaining groove provided on said fastener member to provide a mechanical interlock between said fastener member and said first workpiece.

15. A method of forming a joint as defined in claim 14, wherein during step (d), said projection generally contacts the inner wall of said first workpiece such that during step (f), the material of which said first workpiece is formed flows and is captured between said projection and said first portion.

16. A method of forming a joint as defined in claim 15, wherein step (a) further includes the step of providing said second workpiece with an un-tapped aperture; wherein said means in step (c) comprises a threaded end portion provided on said fastener member shank portion which has a self-tapping thread form thereon, such that when the fastener member is engaged as provided in step (d), said self-tapping thread form will form an internal thread in said un-tapped aperture.

17. A method of forming a joint as defined in claim 14, wherein step (c), said means associated with said fastener member for attaching said fastener member to said second workpiece comprises a separate bolt member that is passed through said second workpiece and is engaged with said fastener member.

* * * * *